United States Patent [19]

Augustijn et al.

[11] 4,141,467
[45] Feb. 27, 1979

[54] FLUID DRIVEN LIQUID DOSING APPARATUS

[75] Inventors: Govert J. P. Augustijn, Vlaardingen; Jacobus H. Beun, Maassluis, both of Netherlands

[73] Assignee: Lever Brothers Company, New York, N.Y.

[21] Appl. No.: 854,566

[22] Filed: Nov. 25, 1977

[30] Foreign Application Priority Data

Nov. 29, 1976 [GB] United Kingdom ............... 49743/76

[51] Int. Cl.² ......................................... B67D 5/22
[52] U.S. Cl. ................................... 222/38; 137/99; 222/133; 222/145; 222/334; 417/395
[58] Field of Search ............... 222/38, 133, 136, 137, 222/145, 334; 417/395; 137/99

[56] References Cited

U.S. PATENT DOCUMENTS

| | | | |
|---|---|---|---|
| 2,238,747 | 4/1941 | Ornstein | 137/99 |
| 2,798,440 | 7/1957 | Hall | 417/395 X |
| 3,224,637 | 12/1965 | Muller | 222/334 X |
| 3,838,946 | 10/1974 | Schall | 417/395 |
| 4,008,984 | 2/1977 | Scholle | 417/395 X |

*Primary Examiner*—Stanley H. Tollberg
*Assistant Examiner*—Fred A. Silverberg

[57] ABSTRACT

The invention relates to an apparatus for dosing a liquid product into water, particularly for dosing a liquid detergent product into the water stream fed to domestic washing machines. The apparatus is driven by the water pressure and therefore consists of two hydraulic pressure chambers into which the water is alternately directed. In these chambers two rigidly connected pistons are moved. The pistons are connected to the housing by membrane seals. On one side of the apparatus a pumping part with a pumping chamber is located, into which one of the pistons can move. The pumping chamber is provided with a non-return valve for unidirectionally controlling the flow of the liquid product from a reservoir and with another non-return valve for unidirectionally feeding the liquid product into the water stream in the common outlet pipe. The pistons are connected to an electrically controlled valve assembly for alternatively directing the water stream to one of the two hydraulic pressure chambers. The aforementioned assembly may comprise a pawl and ratchet operated device for counting, adjusting and limiting the number of strokes for one dosing operation. Different amounts of liquid products can be dosed by predetermining the number of strokes. Differences in the water pressure do not influence the quantities dosed. Water can flow through the apparatus also before and after the dosing operation.

6 Claims, 3 Drawing Figures

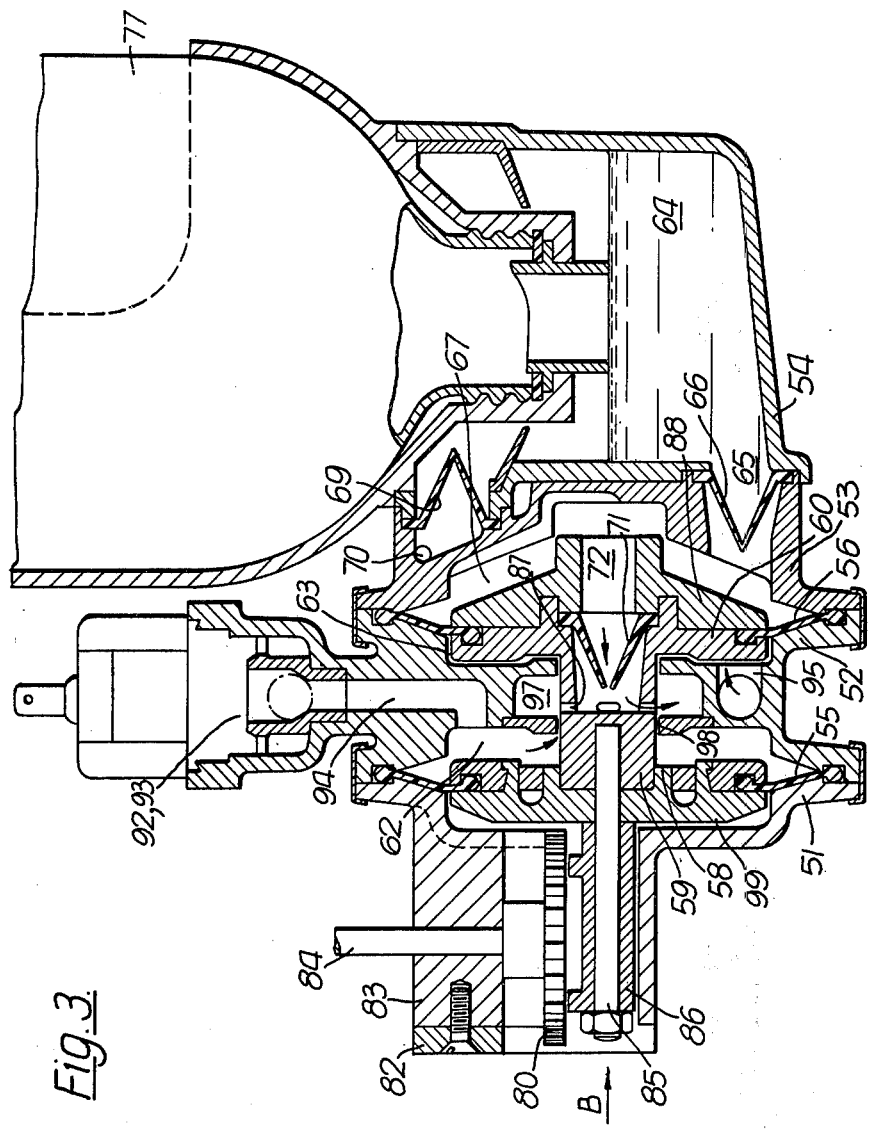

FLUID DRIVEN LIQUID DOSING APPARATUS

The present invention concerns apparatus for dosing a liquid product into water, particularly a liquid detergent product into the waterstream used in washing machines and the like.

The use of an apparatus according to the invention facilitates the achievement of optimum concentrations of the liquid products during use, besides making it possible to use some products more safely, for example in the case of high alkaline liquid detergent products.

It has been proposed previously to dose liquid products into water by pumps being electrically operated, e.g. by motors. Electrical pumps and the devices to count the number of their revolutions to control the dosage used are expensive and very often difficult to adapt to domestic washing machines. According to another proposition a plunger pump operated by water pressure used for dosing liquid detergent products into a washing machine. With such a pump the amounts of the liquid product have been fixed or can be altered only with difficulty, e.g. by adjustment of the stroke length of a piston, one motion of which effects the whole dosing process.

In domestic washing machines the amounts of the liquid detergent products are usually relatively small. The supply of water to the machines may be different and the water pressure may change during the washing process. Liquid detergent products may be aggressive and corrosive so that parts made from metal should be avoided. The known pumps do not correspond to many of these requirements.

It is an object of this invention to provide a dosing apparatus for dosing a liquid product into a water stream, especially for dosing a liquid detergent product into the water stream that is fed to a domestic washing machine, which apparatus is operated by the water passing it and doses an amount of a liquid product in certain relationship to the amount of water but also enables the flow of water without dosing any liquid product, the apparatus being relatively simple and cheap to construct, whilst being reliable and convenient to use in domestic washing machines. Another object of the invention is to provide for the possibility to change the amount of the liquid product used in the water for one washing cycle.

The dosing apparatus according to the invention comprises a driving part consisting of two hydraulic pressure chambers into which the water stream is alternately directed, a pumping chamber and means for alternately directing the water into one of the hydraulic pressure chambers. In the two hydraulic pressure chambers of the driving part, two pistons are reciprocally movable, which are rigidly connected by a shaft, annular membrane seals are provided for a tight closure of the hydraulic pressure chambers and for keeping the pistons movable in these chambers, each of the hydraulic pressure chambers has small orifices, preferably in the shape of a narrow annular gap as an outlet, and an outlet pipe for the water stream is positioned between the two hydraulic pressure chambers. The pumping part has a pumping chamber, into which one of the pistons of the driving part can be moved, a non-return valve for unidirectionally controlling the flow of the liquid product from a reservoir into the pumping chamber and another non-return valve for unidirectionally feeding the liquid product from the pumping chamber into the water stream in the outlet pipe. The means for alternately directing the water stream into one of the hydraulic pressure chambers of the driving part are connected to the pistons, so that at the end of each stroke the valves of the two inlets to the two hydraulic pressure chambers are changed in their position, one being always open and the other being closed.

This form of construction is particularly advantageous as it can operate with relatively low water pressure. It is also possible to maintain a continuous flow of water to the apparatus because the water pressure moves the piston both ways, whereas the flow has to be interrupted if other means, for example a spring, are used on the return stroke of the piston. Also the water pressure would then have to be higher to overcome the pressure of the return spring. If the dosing process stops for any reason, the flow of water through one of the hydraulic pressure chambers can continue.

When two hydraulic pressure chambers are used with two pistons and one pumping chamber, it is preferred to have the common outlet pipe located between the two chambers, and to have the pumping chamber at one end of the apparatus where it is more easily supplied with the liquid product. The outer face of the piston at the other end, i.e. that remote from the pumping chamber, can then be connected to the means for alternately directing the water supply to the two pressure chambers.

The pistons in the pump of the invention are preferably constructed with membrane seals, that is with each piston being connected to the central portion of a membrane of which the periphery is sealed to the body of the pump. We have found that this form of construction is particularly effective for pumping liquid detergent products which are often alkaline and of high viscosity or with suspended particles, which can cause problems with conventional piston seals. Similarly, it is possible that the non-return valves in the pipes for the liquid product to and from the pumping chamber are constructed with membrane seals. Other preferred non-return valves in these pipes are lip-valves.

Each of the hydraulic pressure chambers has an opening directed to the other one in which the shaft between the two pistons can move or swing. These openings are larger than the cross-section of the shaft, thereby providing narrow annular gaps as outlets from the hydraulic pressure chambers to the common outlet. These gaps have such a size as to provide a sufficient pressure drop for the pressure of the water stream to move the pistons, whilst still allowing the water to escape quickly enough from the hydraulic pressure chambers when the water supply thereto is discontinued.

In a preferred embodiment the non-return valve for feeding the liquid product from the pumping chamber into the water stream is arranged in the shaft between the two pistons and has outlet openings directed to the beginning of the outlet pipe for the water stream between the two hydraulic pressure chambers.

This arrangement allows for a good distribution also of a liquid product of high viscosity to be achieved in the water stream in the common outlet.

The dosing apparatus according to the invention is preferably constructed so as to be operable with an adjustable number of strokes, according to the amount of liquid product to be admixed with the water stream.

To this end counting means can be provided for adjusting and limiting the number of strokes, said counting means being connected to the means for alternately directing the water stream into the hydraulic pressure chambers. These counting means may be mechanical ones. Preferably they consist of two parallel spring-connected pawl arms and a ratchet wheel, the pawl arms being located on opposite sides of the ratchet wheel to rotate the wheel at each movement of the pistons, and a stud on the ratchet wheel, the position of which at the beginning of the dosing operation is adjustable and which stud finishes dosing when being stopped by a stop arm.

The apparatus is preferably connected to a liquid product reservoir, which is tightly sealed from its surroundings and is provided with a non-return valve for the inlet of air during the flow of some liquid product from the reservoir into the pumping chamber.

It is preferred to provide the apparatus with a reservoir for the liquid product, which is either a refillable integral chamber or is separately attachable to the pump. Preferably the reservoir includes a replaceable container in which the liquid product may itself be supplied and which is attachable to the pump in an inverted position. In this event it is preferred that the container should be connected to the body of the apparatus by a screw or other tight fitting, which also automatically opens the container at the time of fitting to avoid spilling the product when the container is inverted. For example, the body can have a hollow knife which pierces a weakened part within the neck of the container, for example a heat-sealed foil.

When the liquid product is supplied from an inverted container, it is necessary to arrange for air to replace the liquid product as it is used, and in order to minimise drying of the product in the reservoir by having it open to the atmosphere, it is preferred to have an air pressure equalisation valve between the reservoir and the atmosphere which is opened only when the apparatus is in pumping operation.

The invention is illustrated by the accompanying drawings which are diagrammatic sectional elevations of multiple stroke membrane dosing apparatus with a replaceable liquid product reservoir.

FIGS. 2 and 3 show another dosing apparatus with the pistons in their two end positions.

Figure 1:
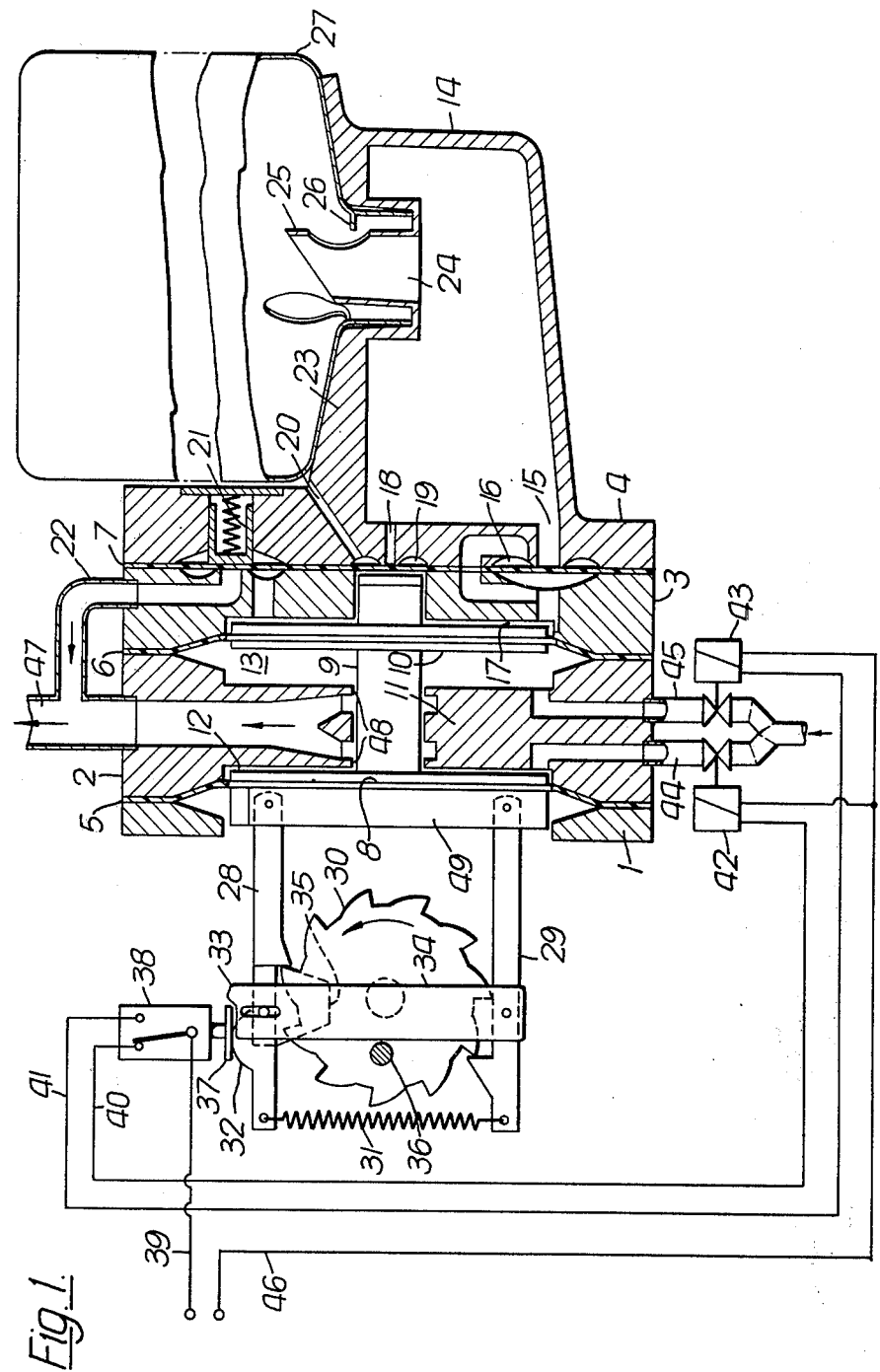
FIG. 1 shows a dosing apparatus.

In FIG. 1 the body of the apparatus is formed of four moulded and machined plastic members 1, 2, 3 and 4 with three flexible membranes 5, 6 and 7 sandwiched between them, respectively, and the whole assembly is held together with transverse bolts (not shown). The centre portion of the membrane 5 is fixed to a first piston 8 which is connected by a rigid shaft 9 to a second piston 10 fixed to the centre portion of the membrane 6. A wall 11 is formed in the body member 2 around the shaft 9 so as to define with the pistons 8 and 10 and the membranes 5 and 6 two hydraulic pressure chambers 12 (shown empty) and 13, a first portion, (shown full), which parts essentially form the dosing or driving part of the apparatus.

The body member 4 is formed with an integral liquid reservoir 14, the conduit means (first) 15 of which leads to a first non-return membrane valve 16 formed in the membrane 7. The outlet from the non-return valve 16 leads to a pumping chamber 17, a second portion, (shown empty) formed between the body member 3, the piston 10, respectively its face outside the pressure chamber 13 and the membrane 6. A further spring loaded second non-return membrane valve 21 is formed in the body member 4 and is connected to an outlet pipe 22 from the pumping chamber 17. Thus these parts define the pumping part. The reservoir 14 is also connected through a pipe 18 to a pressure equalisation membrane valve 19 being part of membrane 7, which is open to the atmosphere through a pipe 20.

The upper surface 23 of the body member 4 is concave and has a central opening 24 which contains a circular hollow knife 25, which is adapted to pierce through the sealed neck 26 of plastic bottles 27 when they are inserted into the opening 24 to form a tight fit against the concave surface 23.

The outer face 49 of the piston 8 is pivotally connected to two parallel pawl arms 28 and 29 which bear on opposite sides of a ratchet wheel 30 and are pressed against the ratchet wheel 30, e.g. by a coil spring 31. A cam 32 is formed integrally on the upper edge of the pawl arm 28 and a cam 33 is located at the end of an arm 34 pivotally connected to the pawl arm 29. The pawl arm 28 also carries a stop arm 35 which projects behind the ratchet wheel 30 into the circular path of a stud 36 on the ratchet wheel.

The two cams 32 and 33 bear on the plunger 37 of a two-way switch 38 connected to an electric supply line 39. The two wires 40 and 41 from the switch are connected to two solenoid valves 42 and 43, which control the flow of water through two water inlet pipes or conduit means (second) 44 and 45 to the hydraulic pressure chambers 12 and 13, respectively. The solenoid valves 42 and 43 are also connected to an electric supply line 46.

An outlet pipe 47 from the two pressure chambers 12, 13 is located in the wall 11 which surrounds the shaft 9 with a small annular gap 48 permitting the water to pass from the chambers 12, 13 to the outlet pipe 47. The size of the annular gap 48 is designed to give a sufficient pressure drop for the water pressure to move the pistons 8, 10 in the hydraulic pressure chambers 12, 13, whilst still giving an adequate water outlet from the chambers. The outlet pipe 22 from the pumping chamber 17 is also connected to the outlet pipe 47 for the water stream.

To use the apparatus according to the invention a full bottle 27 of liquid product is first inverted and fitted to the pump by pressing its neck into the opening 24 above the reservoir 14, whereupon the knife 25 pierces the sealed part of the neck 26 of the bottle and the liquid flows into the reservoir.

The position of the ratchet wheel 30 is then pre-set by dial means not shown, so as to select the amount of first liquid to be pumped and mixed with the water or second liquid. The electricity and water supply are then switched on and the water flows through whichever of the valves 42 and 43 is open, so as to move the pistons 8 and 10 in the appropriate direction until the hydraulic pressure chamber 12 or 13 is full. The movement of the pistons 8, 10 causes rotation of the ratchet wheel 30 by the action of the pawl arms 28 and 29, and each time the pistons reach the limit of movement in either direction the cams 32 and 33 operate the switch 38 to change the valves 42 and 43, and hence to pass the water to the other chamber thereby to reverse the direction of movement of the pistons 8, 10. This continues until the stud 36 reaches a position under the stop arm 35, which prevents the pawl arm 28 from falling and thereby holds open the valve 43, instead of opening the valve 42, and thereby stops the operation of the apparatus. The water can, however, continue to flow through the hydraulic pressure chamber 13 until the water supply is turned off. In the same way some water can flow through the apparatus before the dosing of the liquid product begins, according to a programme of a washing machine.

With each stroke of the piston 10 the liquid product is pumped from the reservoir 14 through the non-return valve 16 into the pumping chamber 17, and then when the piston changes direction the liquid product is pumped out through the pipe 22 and into the water pipe 47. The amount of the liquid product pumped is controlled by the number of strokes of the piston from a minimum of 1 to a maximum of 10 with the ratchet wheel shown. Alternatively by removing the stud 36, the pump can operate continuously to dose the liquid product into the water, i.e. as long as the water flow continues.

In practice, if the apparatus is attached to a washing machine and the liquid product is a detergent composition, the flow of water to the apparatus is controlled automatically by the machine, so as to dose the liquid product into the machine at the appropriate time in the washing cycle. There may also be several of the apparatuses attached to a washing machine for dosing different liquid products into the machine at different times during the wash cycle, for example a bleach, a main wash detergent liquid and a rinse cycle fabric softener. The amount of each of these can be controlled by the user of the washing machine according to the type of fabrics being washed and the wash cycle chosen. In this event, the apparatus may be designed to be connected in series side-by-side, with a common water inlet and a common water outlet pipe, for example by forming the pipes within the body member 2 and clamping the apparatuses together with watertight seals so that the water inlet and outlet are connected only to the end apparatus.

The apparatus shown in FIG. 1 can be readily modified within the invention. Thus in FIGS. 2 and 3 another embodiment is shown. The body is formed of moulded plastic members 51, 52, 53, 54. They are clamped together by rings 75. Annular membrane seals 55, 56 are at their outer edges enclosed between members 51, 52 and 52, 53, respectively. The inner edges of the membrane seals are enclosed between parts of the pistons. A first piston 58 consists of a ring member 90, an outer face part 99 connected to the shaft 59, and a pressure ring 91 in a groove 89 of the outer face part 99 to press said parts together. The second piston 60 is moulded as one part together with the shaft 59 and is connected to an outer part 88. There are again two hydraulic pressure chambers 62 and 63 in the driving part and one pumping chamber 67 in the pumping part.

The non-return valves used in the apparatus shown are lip valves, which are of a flexible material and are almost cone-shaped, having a slit-opening at the top. A non-return valve 66 is located in the outlet 65 of the liquid reservoir 64 which is integral with member 54 and is opened by sucking liquid product from the reservoir to the pumping chamber 67. Another non-return valve 71 of this type is located in a channel 72 formed inside piston 60 and shaft 59. Channel 72 ends in small orifices 87 directly into the beginning of the common outlet 97. Also for the inlet of air to the reservoir 64 a non-return valve 69 of this kind is used. It is connected to the atmosphere via a pipe 70.

The arrangement of the plastic bottle 77 on the liquid reservoir 64 may be about the same as in FIG. 1.

Also means for alternately directing the water stream to one of the hydraulic pressure chambers 62, 63 are similar to those shown in FIG. 1 and consist of a ratchet wheel 80, and pawl arms (not shown) connected to a rod 86 which is fixed to the outer face part 99 of piston 58 by means of a bolt 85. These parts are located within an extension 83 of member 51. By turning the axis 84 of the ratchet wheel 80, a certain position of the wheel and the stud thereon (not shown) can be chosen so as to predetermine the number of strokes for one dosing process. To the end of extension 83 a plate 82 can be screwed by which the apparatus can be fastened anywhere on the washing machine. Electrical switches and connections are not shown in FIGS. 2 and 3 and may be the same as in FIG. 1.

Figure 2:
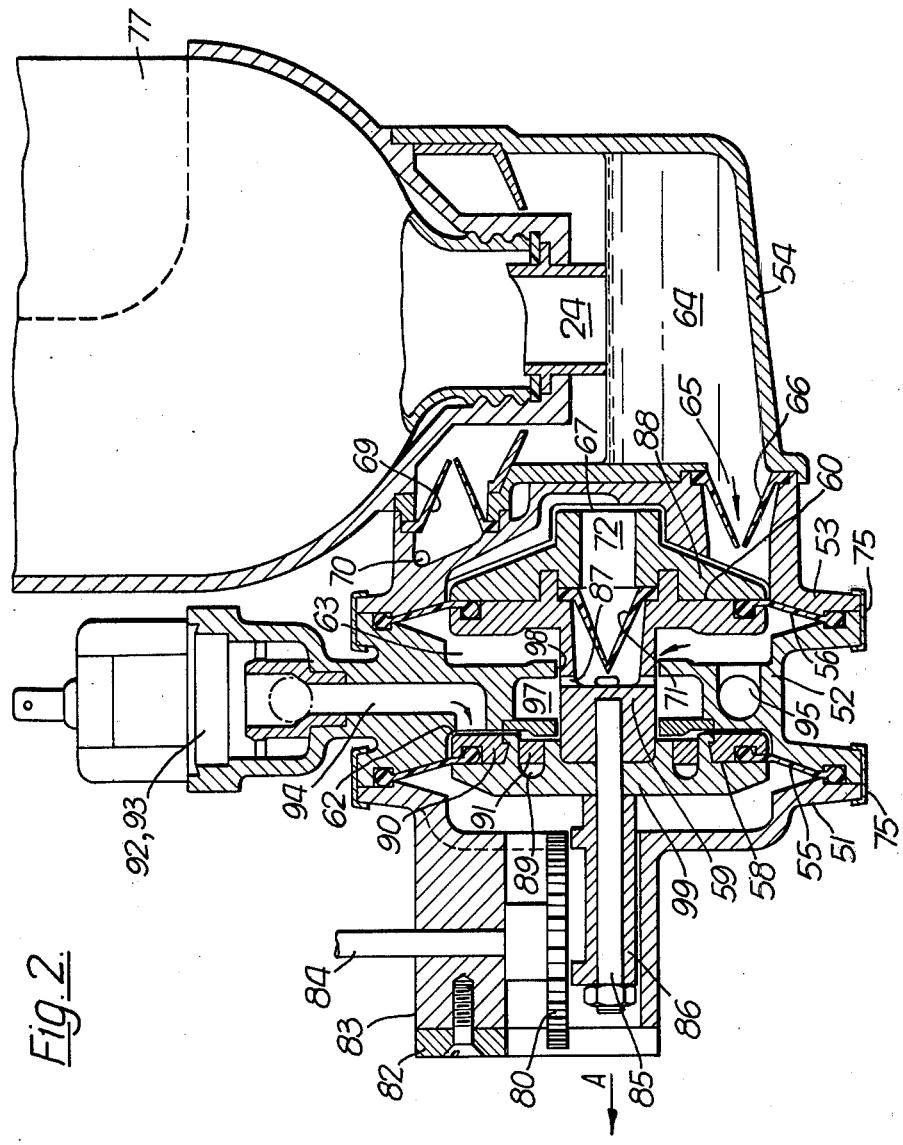

In the position shown in FIG. 2 the solenoid valves 92, 93 have stopped the water streaming through inlet pipe 95 and the water stream is now directed via inlet pipe 94 to hydraulic pressure chamber 62, thus causing the pistons 58, 60 to move in the direction of arrow A. Water is thus pressed out of hydraulic pressure chamber 63 through one of the annular gaps 98 into the common outlet 97, which at least reduces the escape of water from chamber 62. Piston 60 forces the liquid product from reservoir 64 through its outlet 65 and the non-return valve 66 into pumping chamber 67. At the end of this movement ratchet wheel 80 is turned in a new position and the position of valves 92 and 93 is changed.

As is shown in FIG. 3, the water stream is now fed via inlet pipe 95 into hydraulic pressure chamber 63, causing the pistons 58, 60 to move in the direction of arrow B. The liquid product is pressed from pumping chamber 67 via channel 72, non-return valve 71 and orifices 87 into the beginning of outlet pipe 97.

An apparatus as shown in FIGS. 2 and 3, having an outer diameter of the hydraulic pressure chamber of about 80 mm and a stroke length of about 6 mm was tested. It turned out that for one liquid product the volume dosed by one or a certain number of strokes into a defined amount of water flowing through the apparatus was nearly constant, though the pressure of the water supply was increased by 100%, thus also causing the velocity of the water stream and the movement of the pistons to be increased.

Some more modifications are possible within the scope of the invention as far as the construction of the parts is concerned. For example it is possible to use other non-return valves. The pawl arms and ratchet wheel assembly may also readily be modified, to make it more compact if the pump is to be mounted inside a washing machine. Another possible modification is to use an electronic control system to count the number of strokes of the pistons and to stop the pump when the pre-set number of strokes has been completed.

We claim:

1. Apparatus for dosing a liquid product into a water stream which comprises:

a driving part having two hydraulic pressure chambers into which the water stream is alternately directed, a shaft, two pistons reciprocally movable respectively in the hydraulic pressure chambers and being rigidly connected by said shaft, annular membrane seals for ensuring a tight closure of the hydraulic pressure chambers and for keeping the pistons movable in these chambers, a narrow annular gap defining an outlet for each of the hydraulic pressure chambers, an outlet pipe for the water stream positioned between and commonly communicating with the two hydraulic pressure chambers through said annular gap;

a pumping part having a pumping chamber into which one of the pistons of the driving part can be moved, a first non-return valve for unidirectionally controlling the flow of the liquid product from a reservoir into the pumping chamber, and a second non-return valve for unidirectionally controlling the flow of the liquid product from the pumping chamber into the water stream in the outlet pipe; and means connected to the pistons for alternately directing the water stream into one of the hydraulic pressure chambers of the driving part.

2. Apparatus for dosing a liquid product according to claim 1, in which said second non-return valve for directing the liquid product from the pumping chamber into the water stream is arranged in the shaft between the two pistons and has outlet openings directed to the beginning of the oulet pipe for the water stream between the two hydraulic pressure chambers.

3. Apparatus for dosing a liquid product according to claim 1, which comprises counting means for adjusting and limiting the number of strokes, said counting means being connected to the means for alternately directing the water stream to the hydraulic pressure chambers.

4. Apparatus for dosing a liquid product according to claim 3, wherein said counting means comprises two parallel spring-connected pawl arms and a ratchet wheel, the pawl arms being located on opposite sides of the ratchet wheel to rotate the wheel at each movement of the pistons, and a stud affixed on the ratchet wheel, an angular position of said stud and said ratchet wheel at the beginning of the dosing operation being adjustable, a stop arm connected to one of said pawl arms and being engageable by said stud, said stud terminating dosing when being stopped by said stop arm.

5. Apparatus for dosing a liquid product according to claim 1, which comprises a liquid product reservoir being tightly sealed from the atmosphere and being provided with a pressure equilization membrane valve for the inlet of air during the flow of some liquid product from the reservoir into the pumping chamber.

6. Dosing apparatus comprising:
(a) means for defining a pair of chambers in communication with one another;
(b) a pair of pistons each supported for movement in a respective one of said chambers;
(c) means for interconnecting said pistons to one another for movement in unison with one another;
(d) membrane means for dividing each of said chambers into a first portion and a second portion in fluid-sealing isolation with one another, said pistons each being secured to a respective one of said membrane means for flexibly displacing each said membrane means axially in said chambers;
(e) first conduit means for alternately directing the flow of a first fluid into each of said chambers to drive and effect a reciprocation of said pistons in unison;
(f) second conduit means through which a second fluid flows and communicating with said second portion of one of said chambers, said second portion being isolated from the first portion of said one of said chambers through which said first fluid flows by being disposed on an opposite side of its corresponding one of said pistons which faces said first fluid;
(g) valve means operatively associated with said second conduit means for unidirectionally controlling the flow of said second fluid into and through said one of said chamber; and
(h) outlet conduit means commonly communicating with said first portion and said second portion of said one of said chambers and with said first portion of the other of said chambers through which said first fluid flows for effecting mixing of said first and second fluids after each exits from the said chambers.

* * * * *